US008534196B2

(12) United States Patent
Bavaresco et al.

(10) Patent No.: US 8,534,196 B2
(45) Date of Patent: Sep. 17, 2013

(54) CABLE TRANSPORTATION SYSTEM AND RELATIVE OPERATING METHOD

(71) Applicant: Rolic Invest S.AR.L, Luxembourg (LU)

(72) Inventors: Federico Bavaresco, Fie' Allo Sciliar (IT); Peter Leimstadtner, Siusi (IT)

(73) Assignee: Rolic Invest S.AR.L, Luxembourg (LU)

( * ) Notice: Subject to any disclaimer, the term of this patent is extended or adjusted under 35 U.S.C. 154(b) by 0 days.

(21) Appl. No.: 13/755,992

(22) Filed: Jan. 31, 2013

(65) Prior Publication Data

US 2013/0152814 A1 Jun. 20, 2013

Related U.S. Application Data

(63) Continuation of application No. 12/671,876, filed as application No. PCT/EP2008/060247 on Aug. 4, 2008, now Pat. No. 8,393,276.

(30) Foreign Application Priority Data

Aug. 3, 2007 (IT) ............................... MI2007A1618

(51) Int. Cl.
*B61B 7/00* (2006.01)
(52) U.S. Cl.
USPC ......................... 104/112; 104/173.1; 104/281
(58) Field of Classification Search
USPC ............... 104/89, 91, 93, 112, 113, 123, 124, 104/281, 173.1, 180
See application file for complete search history.

(56) References Cited

U.S. PATENT DOCUMENTS

| 472,211 A | 4/1892 | Fralinger |
| 1,944,446 A | 1/1934 | McGowen |
| 2,662,587 A | 12/1953 | McIlvaine |
| 2,710,650 A | 6/1955 | Sowder |
| 2,985,224 A | 5/1961 | Sowder |
| 3,170,412 A | 2/1965 | Sowder |
| 3,934,517 A | 1/1976 | Hirsig |
| 4,185,562 A | 1/1980 | Hatori et al. |
| 4,226,187 A | 10/1980 | Paulsen et al. |
| 4,269,123 A | 5/1981 | Segafredo |
| 4,280,411 A | 7/1981 | Katayose et al. |
| 4,462,314 A | 7/1984 | Kunczynski |

(Continued)

FOREIGN PATENT DOCUMENTS

| AT | 315910 | 6/1974 |
| AT | 342655 | 4/1978 |

(Continued)

OTHER PUBLICATIONS

New Hybrid Transit System Skyrail Midori-Zaka Line Brochure, published prior to Oct. 11, 2012.

(Continued)

Primary Examiner — Jason C Smith
(74) Attorney, Agent, or Firm — Neal, Gerber & Eisenberg LLP

(57) ABSTRACT

A cable transportation system has a pull cable; at least one transportation unit moving along a given path and connectable selectively to the pull cable by a coupling device; at least one passenger station where the transportation unit is detached from the pull cable; and an auxiliary drive device having a linear electric motor extending along a portion of the given path to move the transportation unit along the passenger station.

36 Claims, 8 Drawing Sheets

(56) References Cited

U.S. PATENT DOCUMENTS

| | | | |
|---|---|---|---|
| 4,470,355 A | 9/1984 | Kunczynski | |
| 4,473,011 A | 9/1984 | Wuschek | |
| 4,640,197 A | 2/1987 | Brian | |
| 4,641,587 A | 2/1987 | Dalliard | |
| 4,671,187 A | 6/1987 | Kunczynski | |
| 4,833,997 A | 5/1989 | Cathiard | |
| 4,898,100 A | 2/1990 | Brochand | |
| 5,107,771 A | 4/1992 | Kainz | |
| 5,113,768 A | 5/1992 | Brown | |
| 5,226,368 A | 7/1993 | Brochand et al. | |
| 5,515,789 A | 5/1996 | Brochand et al. | |
| 5,562,040 A * | 10/1996 | Egli | 104/173.1 |
| 5,582,109 A | 12/1996 | Levi et al. | |
| 5,595,122 A | 1/1997 | Levi et al. | |
| 6,036,282 A | 3/2000 | Clarke et al. | |
| 6,345,578 B1 | 2/2002 | Pabst | |
| 6,427,601 B2 * | 8/2002 | Albrich | 104/87 |
| 6,543,366 B2 | 4/2003 | Pabst et al. | |
| 6,585,232 B2 | 7/2003 | Rechenmacher | |
| 7,410,068 B1 | 8/2008 | Andreetto | |
| 7,549,377 B2 | 6/2009 | Pabst | |
| 7,703,396 B2 * | 4/2010 | Nakao et al. | 104/89 |
| 8,037,978 B1 * | 10/2011 | Boren | 188/156 |
| 2002/0007758 A1 * | 1/2002 | Albrich | 104/89 |
| 2002/0026839 A1 | 3/2002 | Lehtovaara | |
| 2002/0088368 A1 | 7/2002 | Pabst et al. | |
| 2006/0016363 A1 * | 1/2006 | Nakao et al. | 104/88.01 |
| 2006/0249718 A1 | 11/2006 | Levi | |
| 2007/0169660 A1 | 7/2007 | Pabst | |
| 2008/0115689 A1 | 5/2008 | Heil et al. | |
| 2008/0229967 A1 * | 9/2008 | Lins et al. | 104/173.1 |
| 2009/0165666 A1 * | 7/2009 | Pabst et al. | 104/112 |
| 2009/0165668 A1 * | 7/2009 | Andreetto | 105/149.1 |
| 2010/0107919 A1 * | 5/2010 | Perakis | 104/112 |
| 2010/0294161 A1 * | 11/2010 | Bavaresco et al. | 104/89 |
| 2012/0024187 A1 * | 2/2012 | Beck | 104/173.1 |

FOREIGN PATENT DOCUMENTS

| | | |
|---|---|---|
| AT | 373832 | 2/1984 |
| AT | 388146 | 5/1989 |
| AT | 390926 | 7/1990 |
| CH | 259291 | 1/1949 |
| CH | 360704 | 3/1962 |
| CH | 554761 | 10/1974 |
| DE | 423865 | 1/1926 |
| DE | 2020746 | 12/1971 |
| DE | 2060030 | 6/1972 |
| DE | 2101743 | 9/1972 |
| DE | 3109294 | 10/1982 |
| DE | 3834116 | 5/1989 |
| DE | 3927757 | 3/1991 |
| DE | 4127373 | 2/1993 |
| EP | 0055955 | 7/1982 |
| EP | 0135239 | 3/1985 |
| EP | 0218306 | 4/1987 |
| EP | 0218897 | 4/1987 |
| EP | 0281205 | 9/1988 |
| EP | 0491632 | 6/1992 |
| EP | 0517622 | 12/1992 |
| EP | 0613807 | 9/1994 |
| EP | 0640518 | 3/1995 |
| EP | 0678433 | 10/1995 |
| EP | 0687607 | 12/1995 |
| EP | 0692418 | 1/1996 |
| EP | 0745526 | 12/1996 |
| EP | 0970864 | 1/2000 |
| EP | 1077167 | 2/2001 |
| EP | 1088729 | 4/2001 |
| EP | 1174323 | 1/2002 |
| EP | 1195305 | 4/2002 |
| EP | 1209055 | 5/2002 |
| EP | 1331151 | 7/2003 |
| EP | 1364853 | 11/2003 |
| EP | 1419950 | 5/2004 |
| FR | 891743 | 3/1944 |
| FR | 913146 | 8/1946 |
| FR | 1100001 | 9/1955 |
| FR | 1199721 | 12/1959 |
| FR | 1423648 | 1/1966 |
| FR | 2340895 | 9/1977 |
| FR | 2387830 | 11/1978 |
| FR | 2391450 | 12/1978 |
| FR | 2392858 | 12/1978 |
| FR | 2562857 | 10/1985 |
| FR | 2670452 | 6/1992 |
| FR | 2706404 | 12/1994 |
| FR | 2823482 | 10/2002 |
| FR | 2867142 | 9/2005 |
| GB | 1326264 | 8/1973 |
| GB | 1353030 | 5/1974 |
| GB | 1460106 | 12/1976 |
| GB | 2017024 | 9/1979 |
| JP | 7-123523 | 5/1995 |
| JP | 2000-302033 | 10/2000 |
| WO | WO 01/87683 | 11/2001 |
| WO | WO2004067347 | 8/2004 |
| WO | WO2004085221 | 10/2004 |
| WO | WO2005032901 | 4/2005 |
| WO | WO2008020021 | 2/2008 |
| WO | WO2008129017 | 10/2008 |
| WO | WO2008129019 | 10/2008 |
| WO | WO2009053485 | 4/2009 |

OTHER PUBLICATIONS

Notice of Opposition for European Patent Application No. 08786860.0 dated Oct. 22, 2012.

Skyrail Midorizaka Line, written by Wikipedia, printed on Oct. 11, 2012 and last modified on Oct. 14, 2011.

Skyrail Midorizaka Line web page http://www 1.u-netsurf.ne.jp/-ichiban/skyrail/index.html, printed on Oct. 11, 2012.

* cited by examiner

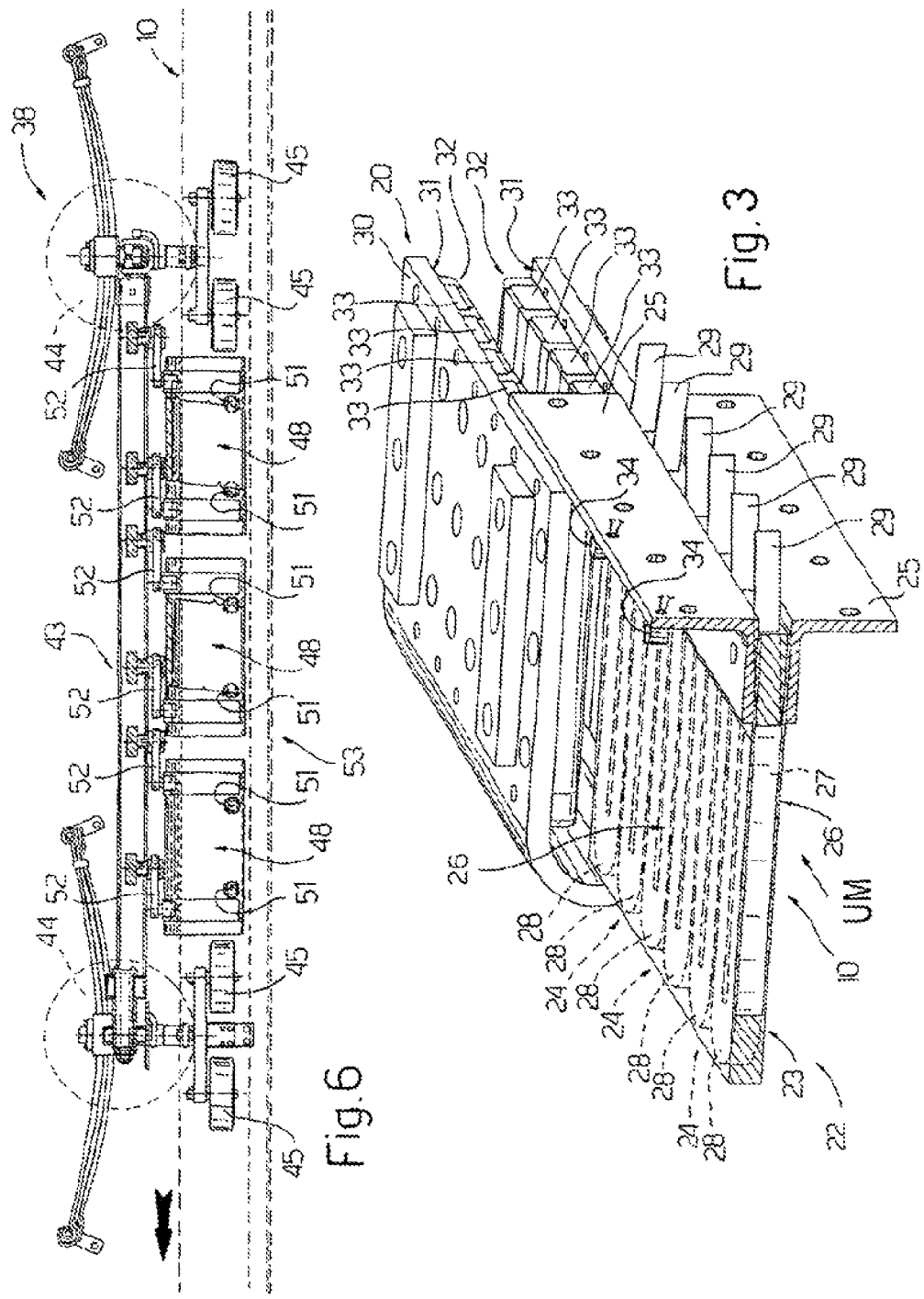

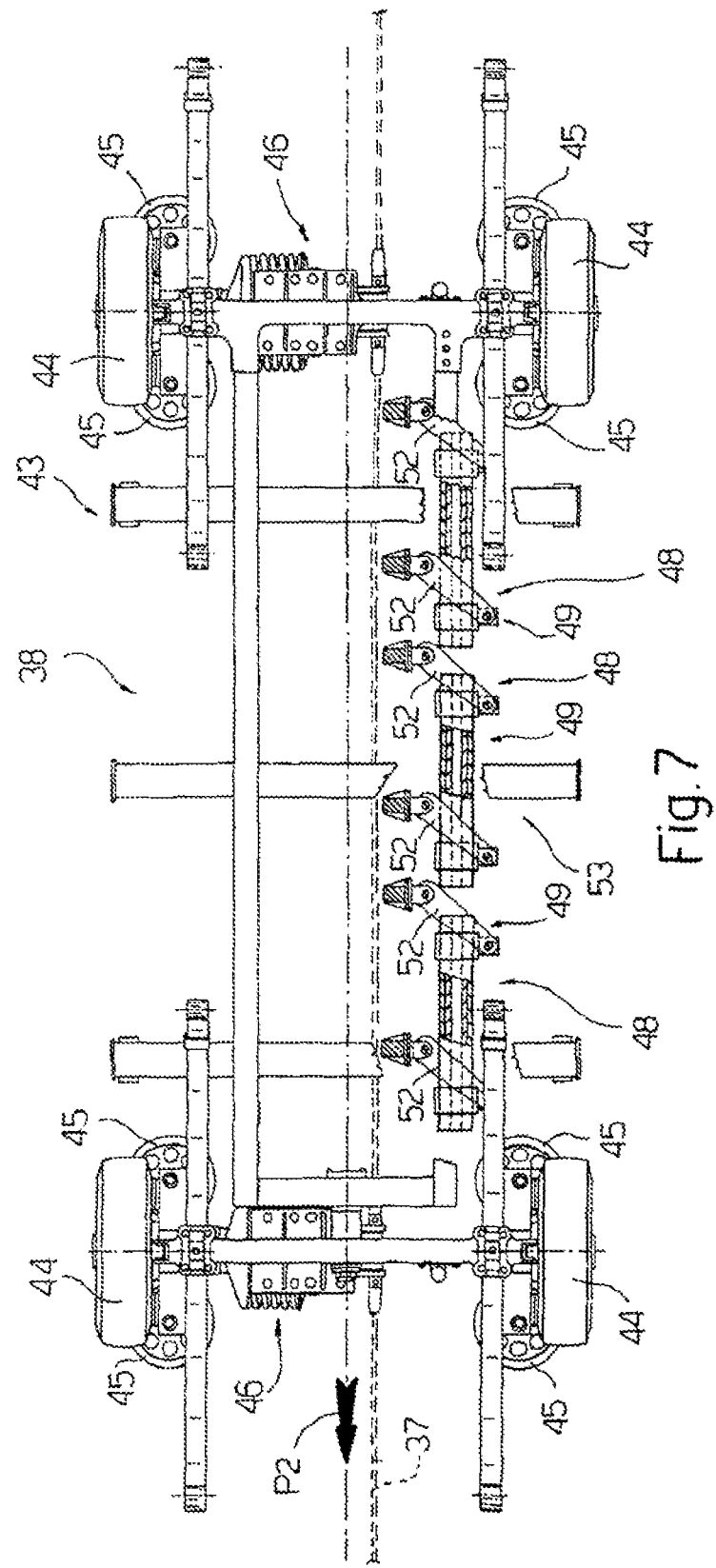

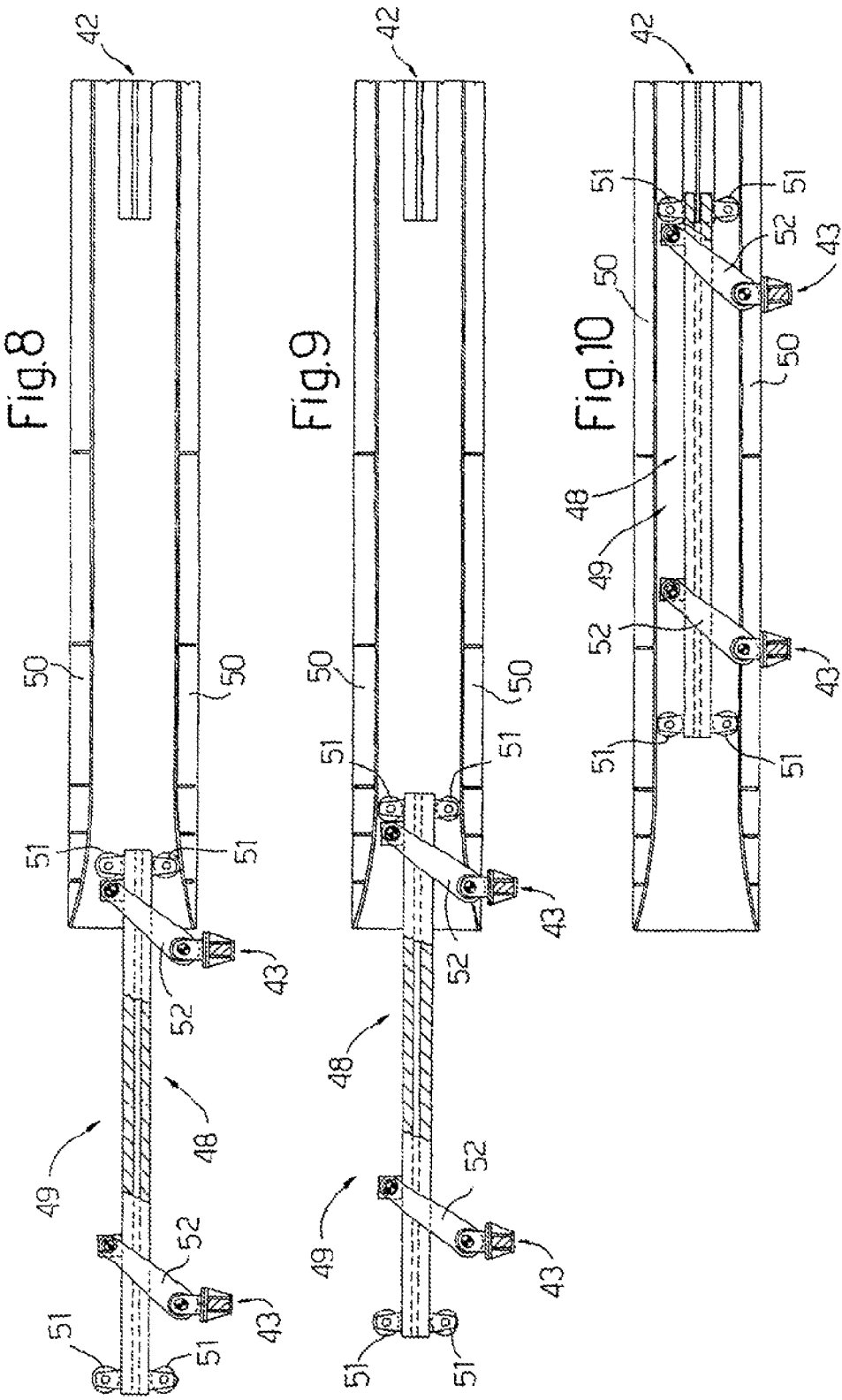

CABLE TRANSPORTATION SYSTEM AND RELATIVE OPERATING METHOD

PRIORITY CLAIM

This application is a continuation application of, claims the benefit of and priority to U.S. patent application Ser. No. 12/671,876, filed on Jun. 24, 2010, which is a national stage application of PCT/EP2008/060247, filed Aug. 4, 2008, which claims the benefit of and priority to Italian Patent Application No. MI2007A 001618, filed on Aug. 3, 2007, the entire contents of which are each incorporated by reference herein.

TECHNICAL FIELD

The present disclosure relates to a cable transportation system.

More specifically, one embodiment of the present disclosure relates to a cable transportation system comprising a pull cable; at least one transportation unit moving along a given or designated path and connectable selectively to the pull cable by a coupling device; at least one passenger station where the transportation unit is detached from the pull cable; and an auxiliary drive device extending along the passenger station to move the transportation unit along a portion of the given or designated path.

BACKGROUND

Certain known cable transportation systems include systems in which the transportation units are suspended from a pull cable, such as chair-lifts or cable-cars, as well as urban transportation systems of the type described in EP Patent Number 0 687 607 B1 and EP Patent Number 1 088 729 B1, in which the transportation units rest on rails and are drawn by a pull cable.

In both of these known cable transportation systems, the auxiliary drive device comprises a succession of wheels aligned along the passenger station. The wheels are rotated by a mechanism operated by the pull cable or, in alternative embodiments, by an actuator independent of the cable, and engage the transportation unit to move it along a given path portion in accordance with a given optimum speed profile comprising a deceleration stage and an acceleration stage.

The wheels of the auxiliary drive device are connected to one another by a drive belt looped about two pulleys. Each wheel is integral with a respective pulley and, by appropriately selecting the pulley diameters, the speed of the adjacent wheel can be increased or reduced to accelerate or decelerate the transportation unit.

Since the auxiliary drive device may comprise curved portions—as in the case of auxiliary drive devices at turnaround stations of cable transportation systems such as chair lifts or cable-cars—power is transmitted between adjacent wheels of the auxiliary drive device using bevel gears; each wheel is integral with a bevel gear meshing with a bevel gear interposed between the two adjacent wheels.

Though effective, currently used auxiliary drive devices are extremely complicated to produce, on account of the high degree of precision involved in assembling the belt, pulley, and bevel gear connections. Moreover, currently used auxiliary drive devices are not very flexible, and fail to provide for easy, relatively low-cost variations in speed.

SUMMARY

It is an object of the present disclosure to provide a cable transportation system designed to eliminate the drawbacks of such known art.

According to one embodiment of the present disclosure, there is provided a cable transportation system, characterized in that the auxiliary drive device comprises a linear electric motor extending along a path portion.

The present disclosure also relates to a method of operating a cable transportation system.

According to one embodiment of the present disclosure, there is provided a method of operating a cable transportation system comprising a pull cable; at least one transportation unit moving along a given or designated path and connectable selectively to the pull cable by a coupling device; and at least one passenger station where the transportation unit is detached from the pull cable; the method being characterized by comprising the step of moving the transportation unit along the passenger station by means of a linear electric motor extending along the path portion.

Additional features and advantages are described in, and will be apparent from, the following Detailed Description and the figures.

BRIEF DESCRIPTION OF THE DRAWINGS

A number of non-limiting embodiments of the present disclosure will be described by way of example with reference to the accompanying drawings, in which:

FIG. 3 shows a larger-scale view in perspective, with parts removed for clarity, of a detail of the FIG. 1 cable transportation system;

FIG. 6 shows a partly sectioned side view, with parts removed for clarity, of a detail of the FIG. 4 cable transportation system;

FIG. 7 shows a partly sectioned plan view, with parts removed for clarity, of a detail of the FIG. 4 cable transportation system;

FIGS. 8, 9 and 10 show larger-scale plan views, with parts removed for clarity, of a detail in FIG. 7;

DETAILED DESCRIPTION

Figure 1:
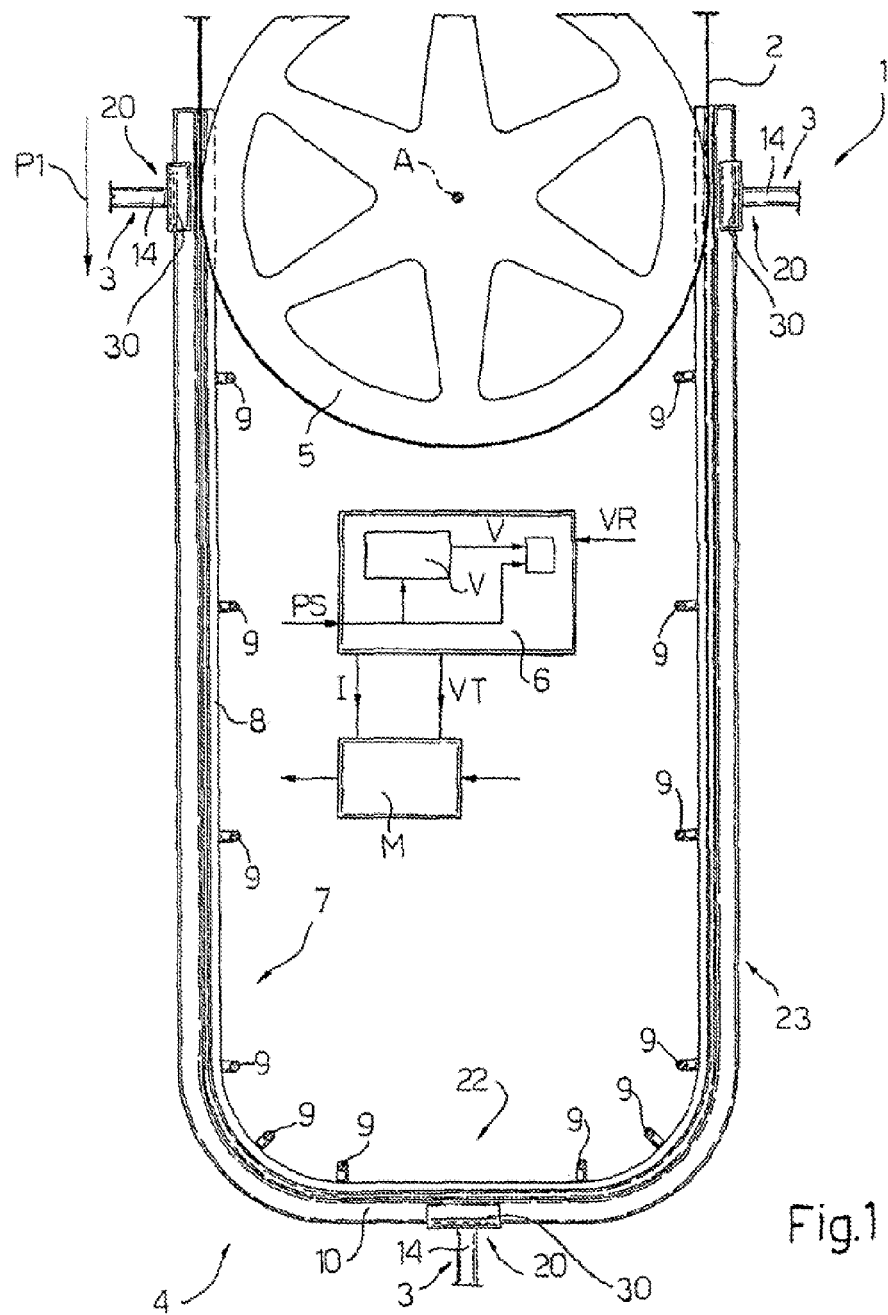
FIG. 1 shows a partly sectioned plan view, with parts removed for clarity, of a cable transportation system in accordance with one embodiment of the present disclosure.

Referring now to the example embodiments of the present disclosure illustrated in FIGS. 1 to 12, number 1 in FIG. 1 indicates a passenger cable transportation system. In the FIG. 1 example embodiment, cable transportation system 1 comprises an endless pull cable 2; and a number of transportation units 3, of the type suspended from pull cable 2 (such as chair-lift chairs or cable-cars) which are moved along a given or designated path P1.

Cable transportation system 1 comprises a passenger station 4 (e.g., a turnaround station) which comprises a pulley 5 rotating about a substantially vertical axis A, and about which pull cable 2 is wound partly; a control unit 6; and a frame 7 supporting transportation units 3 at passenger station 4.

Frame 7 extends along a portion of path P1, and comprises a U-shaped beam 8 supporting a number of supporting structures 9.

Figure 2:
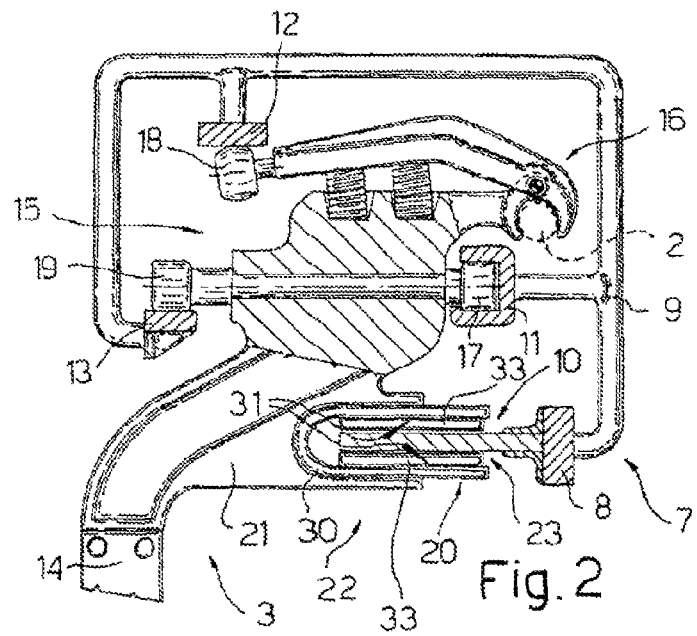
FIG. 2 shows a larger-scale, partly sectioned front view, with parts removed for clarity, of a detail of the FIG. 1 cable transportation system.

With reference to FIG. 2, beam 8 supports a U-shaped linear stator 10 (FIG. 1); and each supporting structure 9 supports three guides 11, 12, 13. Each transportation unit 3 comprises a suspension arm 14; and a trolley 15 which engages guides 11, 12, 13 at station 4, as shown in FIG. 2.

Trolley 15 comprises a coupling device 16 for selectively connecting trolley 15 and transportation unit 3 to the pull cable 2, and which in FIG. 2 is shown releasing pull cable 2.

Trolley 15 has three rollers 17, 18, 19, each of which engages a respective guide 11, 12, 13 to define a given position of trolley 15. For which purpose, guide 11 has a C-shaped cross section, and is engaged by respective roller 17.

Each transportation unit 3 also comprises a slide 20 integral with trolley 15, and which cooperates with stator 10 to move transportation unit 3 through station 4.

Slide 20 is connected to trolley 15 and arm 14 by a flange 21.

Stator 10 and slide 20 define a synchronous linear electric motor 22 operating at passenger station 4. Each transportation unit 3 moving through passenger station 4 is powered by linear motor 22 which is defined by respective slide 20 and by stator 10, and defines an auxiliary drive device of cable transportation system 1.

With reference to FIG. 3, stator 10 comprises an elongated body 23 of nonferrous material (for example a glass-fibre-reinforced epoxy resin); a succession of coils 24 embedded in the nonferrous material; and two flanges 25 to fix elongated body 23 to beam 8. Elongated body 23 has a rectangular cross section, and two opposite, parallel, substantially horizontal main faces 26. Each coil 24 is defined by a plate 27 which is perpendicular to faces 26, is wound to form two windings 28, and has two free ends 29 supplied with electric current.

Constructionwise, in one embodiment, stator 10 is defined by modular units (UM) (FIG. 3), each comprising three successive coils 24. In this embodiment, elongated body 23 is formed by arranging modular units (UM) one after the other.

Each slide 20 comprises a plate 30 bent into a U and having two opposite parallel faces 31, along which are arranged two sets 32 of permanent magnets 33.

The two sets 32 of permanent magnets 33 face each other at such a distance apart as to fit slide 20 about stator 10. That is, each set 32 of magnets 33 is substantially parallel to and faces a face 26 of elongated body 23 to form a gap between permanent magnets 33 and respective face 26.

Each coil 24 is supplied independently of the other coils 24 with electric current, the intensity (I) and frequency (F) of which are modulated by a respective modulator (M) connected to control unit 6 (FIG. 1). In one embodiment, cons 24 are divided into groups, in which each group is supplied with the same current frequency and intensity.

With reference to FIG. 1, depending on a number of position signals (PS) and speed signals (V) related to the positions and speeds of transportation unit 3, and as a function of an optimum speed profile (VR), control unit 6 transmits a regulating signal (VT) to modulator (M), which accordingly regulates the supply current intensity and frequency of the groups of electric coils 24 to produce a speed of transportation unit 3 as close as possible to the optimum speed profile (VR).

For this purpose, cable transportation system 1 comprises a succession of sensors 34 located along the given or designated portion of path P1 at station 4, and which, in the example shown, are proximity sensors for detecting transit of transportation units 3 along station 4 at a given instant. Control unit 6 acquires position signals (PS) from sensors 34, calculates speed signals (V), and compares speed signals (V) with the optimum speed profile (VR).

The optimum speed profile (VR) comprises a deceleration stage; a constant, relatively low-speed travel stage to allow passengers to alight and board transportation unit 3; and an acceleration stage to accelerate transportation unit 3 to a speed as close as possible to the speed of pull cable 2, before connecting transportation unit 3 to the pull cable 2.

Dividing coils 24 into groups comprises forming a group of coils 24 defining a deceleration portion; a group of coils 24 defining an acceleration portion; and a group of coils 24 defining a constant-speed portion between the deceleration and acceleration portions.

The acceleration portion and deceleration portion may comprise a number of groups of coils 24 supplied independently of one another, and in which each group provides for moving a respective transportation unit 3.

Linear motor 22 also provides for other operating modes, such as an emergency operating mode in which all the transportation units 3 at station 4 are stopped automatically, and which short-circuits all the electric coils 24.

Another characteristic of linear motor 22 is that of also reversing transportation units 3 at station 4. This operating mode is achieved by inverting the stage sequence, and is useful in equally spacing transportation units 3.

Figure 4:
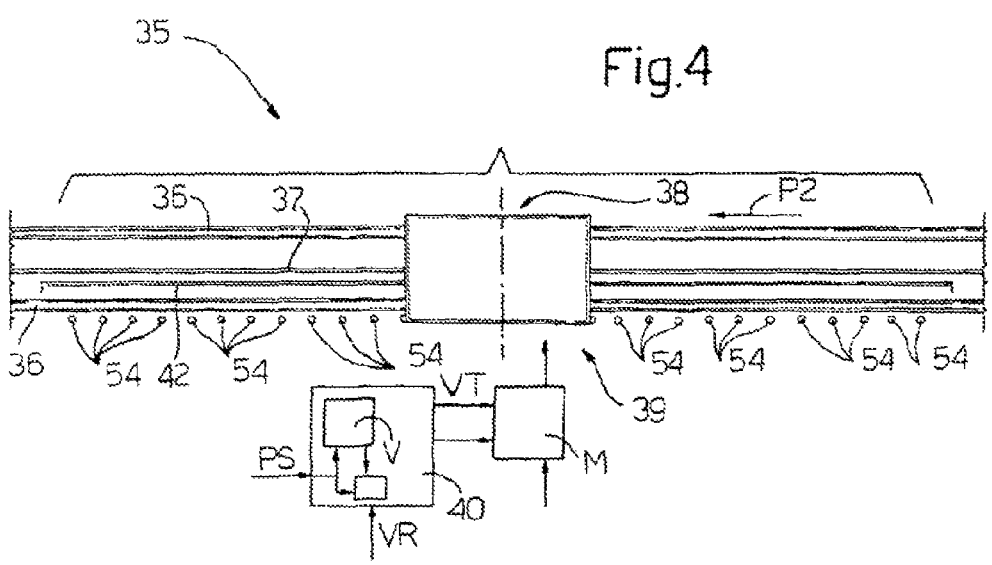
FIG. 4 shows a plan view, with parts removed for clarity, of a cable transportation system in accordance with another embodiment of the present disclosure.

Number 35 in the FIG. 4 embodiment indicates an urban cable transportation system comprising two parallel rails 36 defining a path P2; a continuous pull cable 37 extending along path P2; a transportation unit 38 moving along path P2 and connectable selectively to the pull cable 37; a passenger station 39 extending along a portion of path P2, at which each transportation unit 38 is slowed down, stopped to enable passengers to alight and board transportation unit 38, and accelerated; and a control unit 40.

Figure 5:
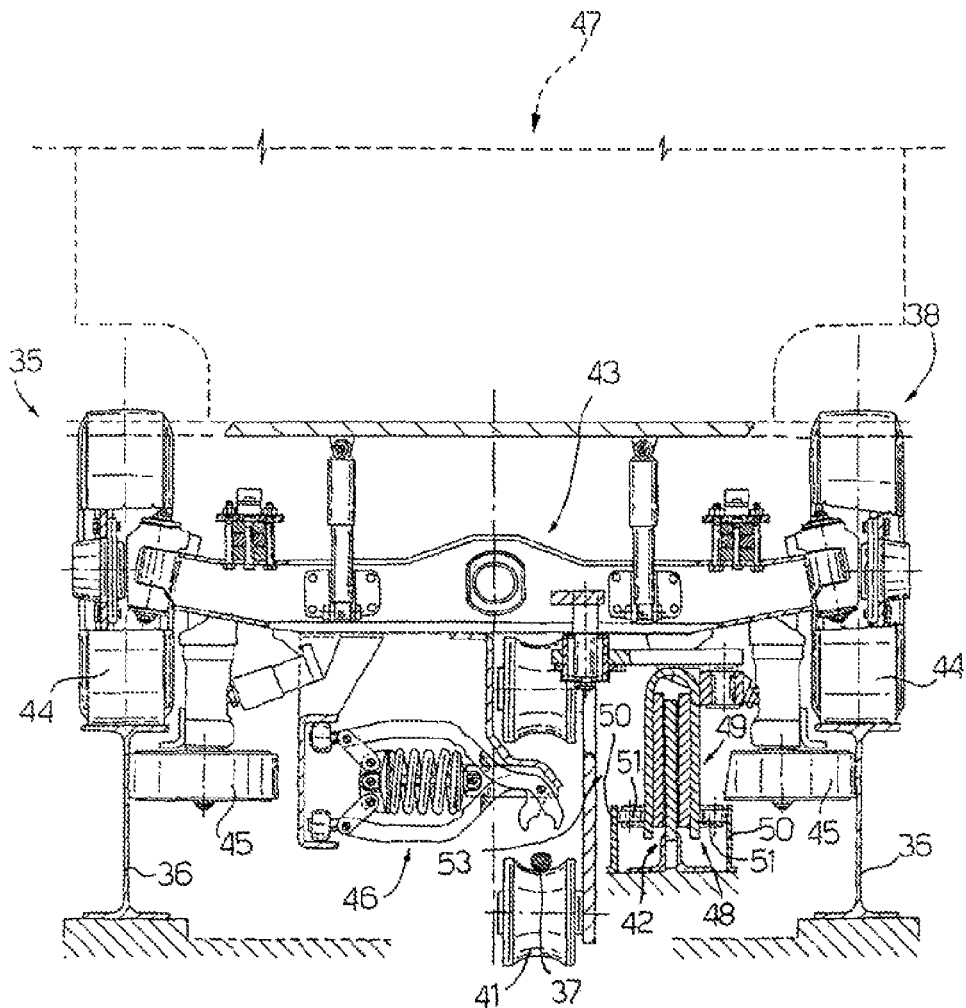
FIG. 5 shows a larger-scale, partly sectioned front view, with parts removed for clarity, of a detail of the FIG. 4 cable transportation system.

With reference to FIG. 5, at the portion of path P2 at passenger station 39 (FIG. 4), cable transportation system 35 comprises pulleys 41 supporting pull cable 37; and a stator 42 structurally identical to stator 10 and therefore described using the same reference numbers. Unlike stator 10, linear stator 42 is positioned with faces 26 substantially vertical.

With reference to FIG. 7, each transportation unit 38 comprises a frame 43; and four wheels 44 connected in pairs along respective axes and resting on top faces of rails 36, as shown more clearly in FIG. 5. With reference to FIG. 5, frame 43 supports pairs of guide wheels 45 resting on inner faces of rails 36. In the example shown, each wheel 44 is associated with a pair of guide wheels 45.

Frame 43 supports a coupling device 46 for connecting transportation unit 38 selectively to the pull cable 37; a cab 47 on top of frame 43; and a group of slides 48 located beneath frame 43 and which engage linear stator 42. In the FIG. 6 example, transportation unit 38 has three slides 48 arranged in series. Each slide 48 has the same technical characteristics described with reference to slide 20, and comprises a trolley 49 which engages two parallel opposite guides 50 (FIG. 5) to equally space slide 48 with respect to linear stator 42 in a direction substantially perpendicular to the lengthwise extension of rails 36 (FIG. 5).

Trolley 49 comprises four rollers 51 fixed to slide 48, as shown more clearly in FIGS. 8, 9 and 10. Slide 48 is connected to frame 43 by two parallel arms 52 hinged to frame 43 and slide 48 about vertical axes to form, with frame 43 and slide 48, an articulated quadrilateral. At least one of arms 52 is preferably connected to a spring (not shown) to position slide 48 in such a manner as to engage guides 50, which are flared at the ends.

Linear stator 42 and slides 48 define a linear motor 53 forming an integral part of an auxiliary drive device for moving transportation units 38 through passenger station 39.

With reference to FIG. 4, cable transportation system 35 comprises sensors 54—in the example shown, proximity sensors—arranged along the portion of path P2 extending along passenger station 39 to acquire a number of position signals (PS) related to the instantaneous position of transportation unit 38 and by which to calculate speed signals (V) related to the speed of transportation unit 38. Position signals (PS) and speed signals (V) are compared with an optimum speed profile (VR) in control unit 40, which transmits a regulating signal (VT) to modulator (M), which accordingly regulates electric current intensity and frequency, and powers groups of electric coils 24 to produce a speed of transportation units 38 as close as possible to optimum speed profile (VR).

In other words, operation is similar to that described with reference to the first embodiment of the present disclosure, except for the stop at passenger station 39.

In this case, optimum speed profile (VR) only comprises a deceleration stage and an acceleration stage, separated by a stop stage of unpredictable duration.

In the embodiments described, linear stators 10 and 42 comprise coils 24, and slides 20 and 48 comprise magnets 33.

Figure 11:
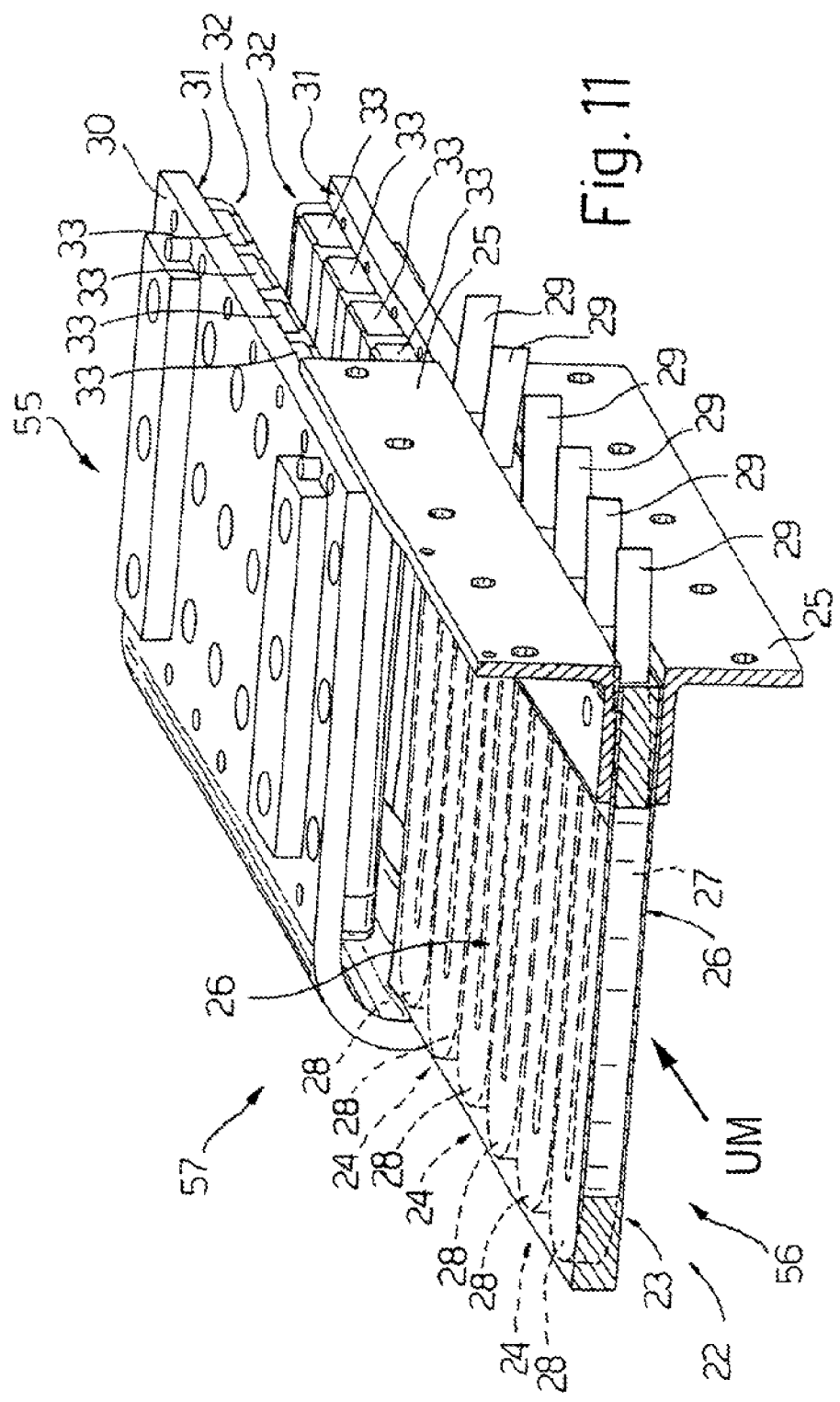
FIG. 11 shows a view in perspective, with parts removed for clarity, of a variation of the present disclosure.

With reference to FIG. 11, the linear stator 55 comprises permanent magnets 33, and the slide 56 comprises coils 24. The component parts in FIG. 11 are indicated using the same reference numbers as in FIG. 3. Coils 24 associated with slide 56 are powered by a strip (not shown), which runs along the path through passenger station 4, 39, and by sliding contacts along the strip, whereas stator 55 is fixed to station 4, 39.

Figure 12:
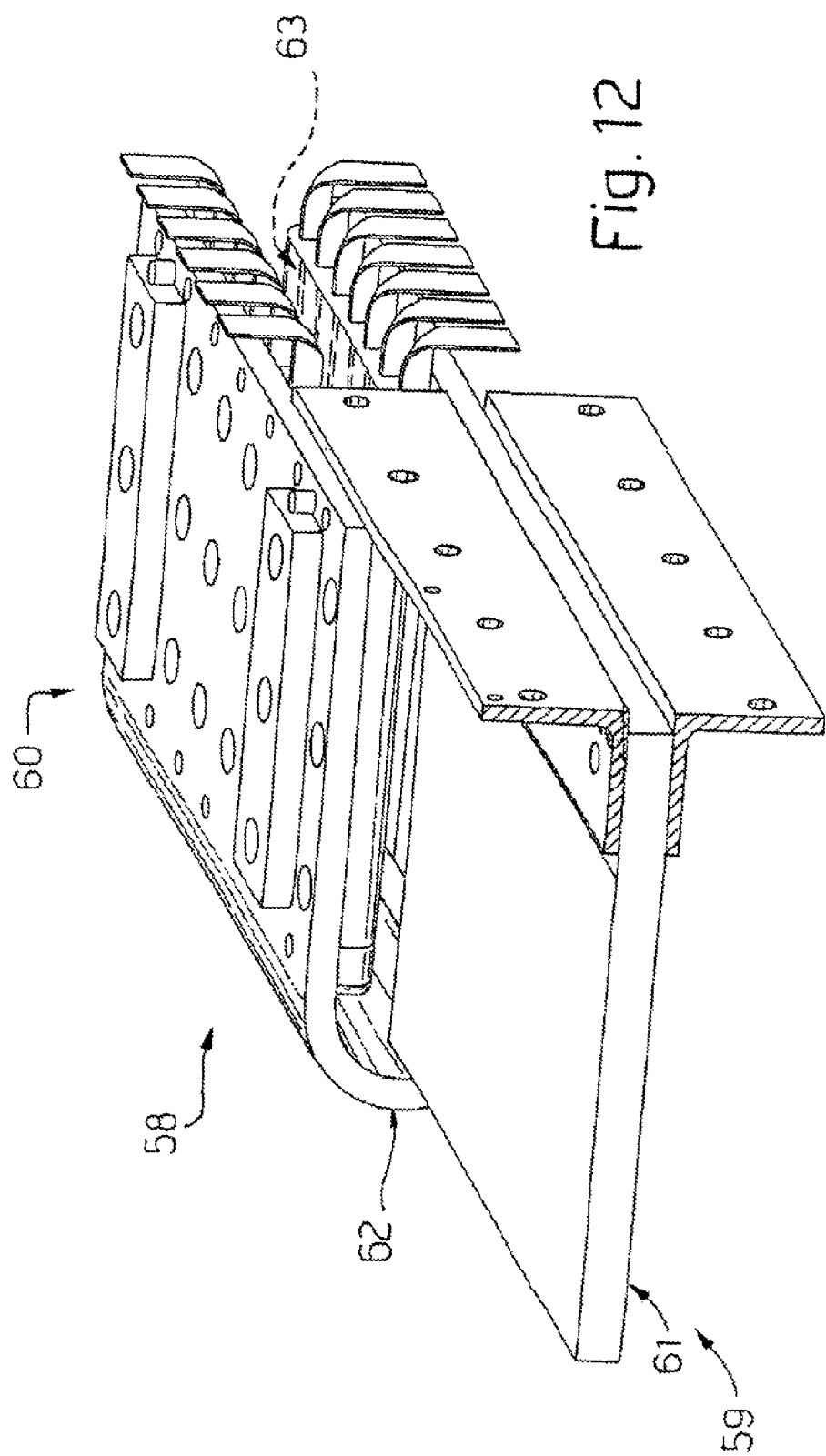
FIG. 12 shows a view in perspective, with parts removed for clarity, of a further variation of the present disclosure.

The embodiments described so far refer specifically to a synchronous linear motor. FIG. 12 shows a variation comprising an asynchronous linear electric motor 58 for application to cable transportation systems 1 and 35.

In the FIG. 12 example, asynchronous linear electric motor 58 comprises a stator 59 and a slide 60. Stator 59 is defined by a metal blade 61, and slide 60 comprises a plate 62 bent into a U and housing electric coils 63 facing blade 61.

In a variation not shown, the slide comprises a metal blade, and the stator comprises a plate bent into a U and housing electric coils.

The FIG. 1 transportation system 1 comprises only one cable, namely a pull cable, it being understood, however, that the present disclosure also applies to cable transportation systems comprising a number of cables, such as a pull cable and one or more supporting cables.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A transportation system comprising:
a transportation unit configured to move along a designated path and selectively connectable to a pull cable by a coupling device; and
an auxiliary drive device extending along the designated path and configured to move the transportation unit along a portion of said designated path, said auxiliary drive device including a synchronous linear electric motor having:
a linear stator extending along said portion of said designated path, said linear stator including a succession of one of: a plurality of electric coils and a plurality of permanent magnets, and
a slide associated with said transportation unit, said slide configured to be magnetically connected to the linear stator when the transportation unit moves along said portion of said designated path, said slide including another one of: the plurality of permanent magnets and the plurality of electric coils and said slide including two sets of permanent magnets, each set of permanent magnets facing the other set of permanent magnets, and both sets of permanent magnets being configured to face the linear stator along said portion of said designated path.

2. The transportation system of claim 1, wherein the linear stator includes the succession of the plurality of electric coils powered selectively with electric energy.

3. The transportation system of claim 2, wherein each electric coil is powered independently of the other electric coils.

4. The transportation system of claim 2, wherein the electric coils are divided into a plurality of groups, each adjacent group of electric coils being powered independently of the other groups of electric coils.

5. The transportation system of claim 2, wherein the linear stator includes an elongated body of nonferrous material in which the plurality of electric coils are embedded.

6. The transportation system of claim 5, wherein the elongated body has two opposite parallel faces, each configured to face the slide.

7. The transportation system of claim 5, wherein the elongated body is defined by a succession of adjacent modular units.

8. The transportation system of claim 1, which includes a control unit, and a plurality of electric current intensity and electric current frequency modulators configured to power the plurality of respective electric coils, wherein said control unit is configured to supply at least one regulating signal to each of the modulators which regulate the current intensity and current frequency to be supplied to the respective coils as a function of at least one of the regulating signals.

9. The transportation system of claim 8, which includes a plurality of sensors arranged successively along said portion of said designated path, wherein each sensor is configured to emit a position signal related to the position of the transportation unit.

10. The transportation system of claim 1, which includes a plurality of guides located parallel to the linear stator, wherein the transportation unit includes a trolley which selectively engages said guides to keep the slide at a designated distance from the linear stator.

11. The transportation system of claim 10, wherein the trolley is configured to move with respect to the transportation unit.

12. The transportation system of claim 11, wherein said transportation unit is configured to be suspended from the pull cable by the coupling device.

13. The transportation system of claim 1, which includes a plurality of transportation units, each transportation unit associated with at least one slide.

14. The transportation system of claim 1, wherein the transportation unit includes a cable car of a cable car transportation system.

15. The transportation system of claim 1, wherein the transportation unit includes a chair of a chair-lift transportation system.

16. A cable transportation system comprising:
   a transportation unit configured to move along a designated path and selectively connectable to a pull cable by a coupling device; and
   an auxiliary drive device configured to move the transportation unit along a portion of said designated path and including a linear electric motor having:
      a linear stator extending along said portion of said designated path and including a succession of a plurality of electric coils, said linear stator including two sets of permanent magnets, each set of permanent magnets facing the other set of permanent magnets, and both sets of permanent magnets being configured to face the plurality of electric coils,
      a slide associated with said transportation unit and configured to be magnetically connected to the linear stator,
      a plurality of electric current intensity and electric current frequency modulators configured to power the respective electric coils, and
      a control unit configured to supply at least one regulating signal to each of the modulators which regulate a current intensity and a current frequency supplied to the respective coils as a function of at least one of the regulating signals.

17. The cable transportation system of claim 16, wherein the linear stator includes an elongated body of nonferrous material in which the plurality of electric coils are embedded.

18. The cable transportation system of claim 17, wherein the elongated body has two opposite parallel faces, each configured to face the slide.

19. The cable transportation system of claim 17, wherein the elongated body is defined by a succession of a plurality of adjacent modular units.

20. The cable transportation system of claim 16, which includes a plurality of sensors arranged successively along said portion of said designated path, each sensor configured to emit a position signal related to the position of the transportation unit.

21. The cable transportation system of claim 16, which includes a plurality of guides parallel to the linear stator, wherein the transportation unit includes a trolley configured to selectively engage the guides to keep the slide at a designated distance from the linear stator.

22. The cable transportation system of claim 21, wherein the trolley is configured to move with respect to the transportation unit.

23. The cable transportation system of claim 22, wherein the trolley is rigidly fixed to the slide and hinged to said transportation unit.

24. The cable transportation system of claim 16, which includes two rails extending along said portion of said designated path, wherein the transportation unit includes a plurality of wheels resting on said rails.

25. The cable transportation system of claim 16, wherein said transportation unit is suspended from the pull cable by said coupling device.

26. The cable transportation system of claim 16, which includes a plurality of transportation units, wherein each transportation unit is associated with at least one slide.

27. The cable transportation system of claim 16, wherein the plurality of electric current intensity and electric current frequency modulators are configured to power a plurality of group of the electric coils and said plurality of regulating signals regulate the current intensity and current frequency to be supplied to the groups of coils as a function of at least one of the regulating signals.

28. A method of operating a cable transportation system including a plurality of transportation units configured to move along a designated path and selectively connectable to a pull cable by a coupling device, and an auxiliary drive device configured to move the transportation units along a portion of said designated path and having a linear electric motor including a linear stator extending along said portion of said designated path and including a succession of a plurality of electric coils, and a plurality of slides, each slide associated with a respective one of the plurality of transportation units and configured to be magnetically connected to the linear stator, said method comprising:
   simultaneously moving at least two of the transportation units along the same linear stator,
   acquiring: (i) a plurality of position signals related to a plurality of positions of the transportation units, and (ii) a plurality of speed signals related to a plurality of speeds of the transportation units, and
   for at least one of the transportation units, supplying a regulating signal as a function of a comparison between the position and speed signals of said transportation unit and an optimum speed profile along a passenger station.

29. The method of claim 28, which includes powering each electric coil independently of the other electric coils.

30. The method of claim 29, which includes modulating the intensity of a current supplied to each electric coil.

31. The method of claim 30, which includes modulating a frequency of the electric current supplied to each electric coil.

32. The method of claim 28, which includes guiding the transportation unit along the linear stator using a plurality of guides parallel to the linear stator, wherein the transportation unit includes a trolley which selectively engages said guides to keep the slide at a designated distance from the linear stator.

33. A transportation system comprising:
   a transportation unit configured to move along a designated path and selectively connectable to a pull cable by a coupling device; and
   an auxiliary drive device extending along the designated path and configured to move the transportation unit along a portion of said designated path, said auxiliary drive device including a synchronous linear electric motor having:
      a linear stator extending along said portion of said designated path, said linear stator including a succession of a plurality of permanent magnets, and said linear stator including two sets of permanent magnets, each set of permanent magnets facing the other set of permanent magnets, and
      a slide associated with said transportation unit, said slide configured to be magnetically connected to the linear stator when the transportation unit moves along said portion of said designated path, said slide including a succession of a plurality of electric coils, wherein both sets of permanent magnets of the linear stator are configured to face the plurality of electric coils of the slide.

34. A cable transportation system comprising:
   a transportation unit configured to move along a designated path and selectively connectable to a pull cable by a coupling device; and
   an auxiliary drive device configured to move the transportation unit along a portion of said designated path and including a linear electric motor having:

a linear stator extending along said portion of said designated path and including a succession of a plurality of electric coils, said stator including an elongated body of nonferrous material in which the plurality of electric coils are embedded, said elongated body having two opposite parallel faces, a slide associated with said transportation unit and configured to be magnetically connected to the linear stator, each of the opposite parallel faces of the elongated body being configured to face the slide, a plurality of electric current intensity and electric current frequency modulators configured to power the respective electric coils, and a control unit configured to supply at least one regulating signal to each of the modulators which regulate a current intensity and a current frequency supplied to the respective coils as a function of at least one of the regulating signals.

35. A method of operating a cable transportation system including a plurality of transportation units configured to move along a designated path and selectively connectable to a pull cable by a coupling device, and an auxiliary drive device configured to move the transportation units along a portion of said designated path and having a linear electric motor including a linear stator extending along said portion of said designated path and including a succession of a plurality of electric coils, and a plurality of slides, each slide associated with a respective one of the plurality of transportation units and configured to be magnetically connected to the linear stator, said method comprising:

powering each electric coil independently of the other electric coils, modulating the intensity of a current supplied to each electric coil, and simultaneously moving at least two of the transportation units along the same linear stator.

36. The method of claim 35, which includes modulating a frequency of the electric current supplied to each electric coil.

* * * * *